(12) United States Patent
Price

(10) Patent No.: US 10,442,901 B2
(45) Date of Patent: Oct. 15, 2019

(54) POWDER COMPOSITIONS COMPRISING BIMODAL/MULTIMODAL PARTICLES, AND ARTICLES PREPARED THEREFROM

(71) Applicant: SABIC GLOBAL TECHNOLOGIES B.V., Bergen Op Zoom (NL)

(72) Inventor: Brian Price, Mount Vernon, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 109 days.

(21) Appl. No.: 15/757,169

(22) PCT Filed: Sep. 2, 2016

(86) PCT No.: PCT/US2016/050052
§ 371 (c)(1),
(2) Date: Mar. 2, 2018

(87) PCT Pub. No.: WO2017/040893
PCT Pub. Date: Mar. 9, 2017

(65) Prior Publication Data
US 2018/0273707 A1   Sep. 27, 2018

Related U.S. Application Data

(60) Provisional application No. 62/214,386, filed on Sep. 4, 2015.

(51) Int. Cl.
*C08L 101/12* (2006.01)
*B32B 5/16* (2006.01)
(Continued)

(52) U.S. Cl.
CPC ............. *C08J 3/28* (2013.01); *B29C 43/003* (2013.01); *B29C 64/153* (2017.08); *B33Y 10/00* (2014.12);
(Continued)

(58) Field of Classification Search
CPC ..... C08L 101/12; C08L 2203/00; B33Y 70/00
See application file for complete search history.

(56) References Cited

U.S. PATENT DOCUMENTS 5,185,108 A   2/1993   Shimandle
5,817,206 A   10/1998  McAlea et al.
(Continued)

FOREIGN PATENT DOCUMENTS

CN   103980429 B   *   2/2016
EP   0154189 A2       9/1985
(Continued)

OTHER PUBLICATIONS

International Search Report; International Application No. PCT/US2016/050052; International Filing Date Sep. 2, 2016; dated Dec. 2, 2016; 4 pages.
(Continued)

*Primary Examiner* — Hoa (Holly) Le
(74) *Attorney, Agent, or Firm* — Cantor Colburn LLP

(57) ABSTRACT

A powder composition including a plurality of thermoplastic particles having an optimized particle size and particle size distribution is disclosed. The powder composition includes a plurality of thermoplastic particles having a bimodal particle size distribution or a trimodal particle size distribution. Also disclosed are methods of preparing three-dimensional articles, methods of preparing a powder coating, and articles prepared by the methods.

20 Claims, 2 Drawing Sheets

(51) Int. Cl.
*C08J 3/28* (2006.01)
*C08J 3/12* (2006.01)
*B33Y 70/00* (2015.01)
*B29C 64/153* (2017.01)
*B33Y 10/00* (2015.01)
*B29C 43/00* (2006.01)
*C08J 5/00* (2006.01)
*C08K 3/22* (2006.01)
*C09D 5/03* (2006.01)
*C09D 179/08* (2006.01)
*C08K 3/36* (2006.01)
*B33Y 80/00* (2015.01)
*B29K 101/12* (2006.01)

(52) U.S. Cl.
CPC .............. *B33Y 70/00* (2014.12); *C08J 3/12* (2013.01); *C08J 3/124* (2013.01); *C08J 5/00* (2013.01); *C08K 3/22* (2013.01); *C09D 5/031* (2013.01); *C09D 5/037* (2013.01); *C09D 179/08* (2013.01); *B29K 2101/12* (2013.01); *B33Y 80/00* (2014.12); *C08J 2379/08* (2013.01); *C08K 3/36* (2013.01); *C08K 2003/2227* (2013.01)

(56) References Cited

U.S. PATENT DOCUMENTS

| | | | |
|---|---|---|---|
| 6,136,948 A * | 10/2000 | Dickens, Jr. | B29C 41/003 528/323 |
| 6,531,086 B1 | 3/2003 | Larsson | |
| 2003/0092837 A1 | 5/2003 | Eichenauer | |
| 2003/0130418 A1 | 7/2003 | Hamilton et al. | |
| 2012/0329659 A1 | 12/2012 | Holcomb | |
| 2014/0264187 A1 | 9/2014 | Lake et al. | |
| 2014/0295363 A1 | 10/2014 | Sun et al. | |

FOREIGN PATENT DOCUMENTS

| | | |
|---|---|---|
| WO | 9606881 A2 | 3/1996 |
| WO | 2007079270 A2 | 7/2007 |
| WO | 2013175448 A1 | 11/2013 |
| WO | 2014072923 A1 | 5/2014 |
| WO | 2014083277 A1 | 6/2014 |
| WO | 2015157148 A1 | 10/2015 |

OTHER PUBLICATIONS

Li et al "Experimental size ratio and compositional effects on the packing and hot isostatic pressing of spherical powders"; Materials Science and Engineering, A157; 1992; pp. 217-224.

Written Opinion of the International Searching Authority; International Application No. PCT/US2016/050052; International Filing Date Sep. 2, 2016; dated Dec. 2, 2016; 7 pages.

* cited by examiner

POWDER COMPOSITIONS COMPRISING BIMODAL/MULTIMODAL PARTICLES, AND ARTICLES PREPARED THEREFROM

CROSS-REFERENCE TO RELATED APPLICATIONS

This application is a National Stage application of PCT/US2016/050052, filed Sep. 2, 2016, which claims the benefit of U.S. Provisional Application No. 62/214,386, filed Sep. 4, 2015, both of which are incorporated by reference herein in their entirety.

BACKGROUND

A number of manufacturing processes make use of particulate thermoplastic polymer compositions, commonly known in the art as "powder compositions." Additive manufacturing (AM, also known as "three-dimensional" or "3D" printing) is a process for the manufacture of three-dimensional objects by formation of multiple fused layers. AM methods using powder compositions include powder bed fusing. In powder bed fusing, thermal energy selectively fuses regions of a powder bed. In particular, selective laser sintering (SLS) is a powder bed fusion process using one or more lasers to fuse powdered thermoplastic polymers into the desired three-dimensional shape. In powder coating, the powder composition is applied to a surface, for example electrostatically, and then heated, allowing the particles to coalesce and form a film. Powder compositions have also been compression molded to form articles.

Despite their long use, there remains a need in the art for optimized powder properties, in particular optimized shape and size of the polymer particulates. Ease of particle handling has driven practitioners to larger particle sizes. However, larger particle sizes coalesce more slowly during the sintering process. Particle size can also affect the porosity of the final product. In the manufacturing of parts by the sintering of particles, the mechanical properties of the final article can be deficient compared to the same article formed of the same material by methods such as injection molding. This discrepancy in properties is typically attributable to the increased porosity of the sintered part resulting from suboptimal packing and coalescence of the particles.

It can further be difficult to use amorphous thermoplastic polymers in these processes, particularly in powder bed fusing, because the amorphous polymers do not have a sharp melting point. This property causes the applied thermal energy source (e.g., a laser beam) to be dissipated into the regions surrounding the location where the energy beam strikes the bed. This undesired dissipation of thermal energy can cause unstable processing as well as poor feature resolution in the intended three-dimensional articles being produced.

Therefore, there is a need in the art for powder compositions having optimized size and shape characteristics. It would be a further advantage if such compositions provided improved processing of amorphous polymers.

BRIEF DESCRIPTION

In an embodiment, a powder composition comprises a plurality of thermoplastic particles characterized by a bimodal particle size distribution comprising, based on the total weight of the particles, 85 to 94 weight percent (wt %), preferably 87 to 91 wt %, more preferably 89 wt % of the particles having a first D50 less than 1 millimeter; and 6 to 15 wt %, preferably 9 to 13 wt %, more preferably 11 wt % of the particles having a D50 that is 0.414 times the first D50.

In another embodiment, a powder composition comprises a plurality of thermoplastic particles characterized by a bimodal particle size distribution comprising, based on the total weight of the particles, 67 to 77 wt %, preferably 70 to 74 wt %, more preferably 72 wt % of the particles having a first D50 less than 1 millimeter; and 23 to 33 wt %, preferably 26 to 30 wt %, more preferably 28 wt % of the particles having a second D50 that is 0.732 times the first D50.

In another embodiment, a powder composition comprises a plurality of thermoplastic particles characterized by a trimodal particle size distribution comprising, based on the total weight of the particles, 66 to 76 wt %, preferably 69 to 73 wt %, more preferably 71 wt % of the particles having a first D50 less than 1 millimeter; 23 to 33 wt %, preferably 26 to 30 wt %, more preferably 28 wt % of the particles having a second D50 that is 0.732 times the first D50; and 0.5 to 5 wt %, preferably 1 to 3 wt %, more preferably 1 wt % of the particles having a third D50 that is 0.268 times the first D50.

A method of preparing a three-dimensional article comprises powder bed fusing the powder composition to form a three-dimensional article.

A three-dimensional article prepared by the above method is also disclosed.

A method of preparing a powder coating comprises applying a powder coating layer comprising the powder composition to a substrate; and consolidating the powder coating layer to form the powder coating.

A powder coated article made by the above method is also disclosed.

A method of preparing a three-dimensional article comprises compression molding the powder composition to form the three-dimensional article.

A three-dimensional article made by the above method is also disclosed.

The above described and other features are exemplified by the following figures and detailed description.

BRIEF DESCRIPTION OF THE DRAWINGS

The following figures are of exemplary embodiments.

DETAILED DESCRIPTION

Disclosed herein are particulate thermoplastic compositions (also referred to herein as "powder compositions") having optimized particle size and particle size distribution. The present inventors have unexpectedly found that powder compositions having a specified particle size and particle size distribution can advantageously be used in various additive manufacturing processes to provide three-dimensional articles with decreased void volume to due optimal particle packing. Particularly, the powder compositions can have multimodal particle size distributions that can fill space in an optimal manner, so as to provide a three dimensional article having no unintended voids. Articles prepared from powder compositions having optimized particle size and particle size distribution can have improved mechanical properties due to the decreased porosity that arises from the optimal packing and coalescence of the particles.

Figure 1:
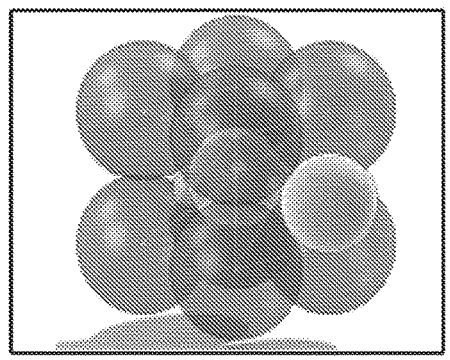
FIG. 1 shows a cubic lattice showing three sizes of spheres that can fit in the lattice simultaneously.

An optimized particle size distribution of the thermoplastic particles of a powder composition can be achieved by reducing the volume that is not occupied by the particles when packed. Optimized particle size distributions can be determined using simple models of cubic- and face-centered cubic lattices. An exemplary cubic lattice showing three sizes of spheres that can fit in the lattice simultaneously is shown in FIG. 1. On a cubic lattice, as shown in FIG. 1, the largest particle size determines the cube. The size of the largest particles can be referred to as $D_1$. Using a single particle size, the resulting cube has a porosity of 48% (i.e., 52% of the total volume of the cube is filled by the single size particles). The next largest sphere (having a size referred to as $D_2$) that can fit inside the remaining space of the cube created by the largest spheres can be defined by $D_2=(3^{1/2}-1)D_1$. Thus in some embodiments, when particles having a size $D_2$ are included in the cube, the porosity can be decreased to 27% (i.e., 73% of the total volume of the cube is filled by the particles having a bimodal distribution comprising $D_1$ and $D_2$). In another embodiment, particles having a third size $D_3$, wherein $D_3<D_2<D_1$, can be added to the cube to further decrease the porosity. $D_3$ can be defined by $D_3=(2-3^{1/2})D_1$. Thus in some embodiments, when particles having a size $D_3$ are included in the cube, the porosity can be decreased to 24% (i.e., 76% of the total volume of the cube is filled by the particles comprising a trimodal distribution comprising $D_1$, $D_2$, and $D_3$).

Figure 2:
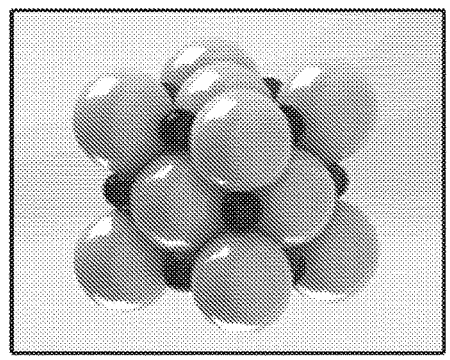
FIG. 2 shows a face-centered cubic lattice showing two sizes of spheres that can fit in the lattice simultaneously.

An exemplary face-centered cubic lattice is shown in FIG. 2. Using a similar procedure as described above, the two largest particles sizes ($D_1$ and $D_2$) that can simultaneously fit in the face-centered cubic lattice can be determined. In an embodiment, the relationship between $D_1$ and $D_2$ can be defined by $D_2=(2^{1/2}-1)D_1$.

Accordingly, one aspect of the present disclosure is a powder composition comprising a plurality of thermoplastic particles characterized by a multimodal distribution, preferably a bimodal distribution or a trimodal distribution. In an embodiment, a powder composition comprises a plurality of thermoplastic particles characterized by a bimodal particle size distribution comprising, based on the total weight of the particles, 85 to 94 wt %, preferably 87 to 91 wt %, more preferably 89 wt % of the particles having a first D50 less than 1 millimeter; and 6 to 15 wt %, preferably 9 to 13 wt %, more preferably 11 wt % of the particles having a D50 that is 0.414 times the first D50. As used herein, D50 refers to the particle diameter of the powder where 50 wt % of the particles in the total distribution of the referenced sample have the noted particle diameter or smaller. Particle sizes can be measured by any suitable methods that are generally known to measure particle size by diameter. In some embodiments, the particle size is determined by laser diffraction. For example, particle size can be determined using a diffractometer such as the Mastersizer 3000 from Malvern.

In an embodiment, a powder composition comprises a plurality of thermoplastic particles characterized by a bimodal particle size distribution comprising, based on the total weight of the particles, 67 to 77 wt %, preferably 70 to 74 wt %, more preferably 72 wt % of the particles having a first D50 less than 1 millimeter; and 23 to 33 wt %, preferably 26 to 30 wt %, more preferably 28 wt % of the particles having a second D50 that is 0.7732 times the first D50.

In another embodiment, a powder composition comprises a plurality of thermoplastic particles characterized by a trimodal particle size distribution comprising, based on the total weight of the particles, 66 to 76 wt %, preferably 69 to 73 wt %, more preferably 71 wt % of the particles having a first D50 less than 1 millimeter; 23 to 33 wt %, preferably 26 to 30 wt %, more preferably 28 wt % of the particles having a second D50 that is 0.7732 times the first D50; and 0.5 to 5 wt %, preferably 1 to 3 wt %, more preferably 1 wt % of the particles having a third D50 that is 0.268 times the first D50.

In some embodiments, the first D50 is 1 nanometer (nm) to 500 micrometers (μm), preferably 15 nm to 100 μm, more preferably 25 nm to 50 μm. In some embodiments, the first D50 is 100 nm to 50 μm, preferably 150 nm to 25 μm, more preferably 200 nm to 10 μm.

The powder compositions having the above-described particle size distributions comprise thermoplastic particles comprising a thermoplastic polymer. The particles can generally be of any shape suitable for a desired application. In some embodiments, the particles are preferably spherical particles, and more preferably are spherical particles having a sphericity of 0.9 to 1. Alternatively, or in addition, the thermoplastic particles can each have a minimum and a maximum radius of within 10%, preferably within 5%.

As used herein, the term "thermoplastic" refers to a material that is plastic or deformable, melts to a liquid when heated, and freezes to a brittle, glassy state when cooled sufficiently. Thermoplastics are typically high molecular weight polymers. The thermoplastic polymer can be crystalline, semi-crystalline, or amorphous. The terms "amorphous" and "crystalline" as used herein are accorded their usual meanings in the polymer art. For example, in an amorphous polymer the molecules can be oriented randomly and can be intertwined, and the polymer can have a glass-like, transparent appearance. In crystalline polymers, the polymer molecules can be aligned together in ordered regions. In the polymer art, some types of crystalline polymers are sometimes referred to as semi-crystalline polymers. The term "crystalline" as used herein refers to both crystalline and semi-crystalline polymers. In some embodiments, a crystalline thermoplastic polymer can have a percent crystallinity of at least 20%, for example 20 to 80%, preferably, at least 25%, for example 25 to 60%, or 25 to 30%, more preferably at least 27%, for example 27 to 40%. The term "percent crystallinity" or "% crystallinity" as used herein, refers to the portion of the polymer that has a crystalline form. The percentage is based upon the total weight of the crystalline polymer. In some embodiments, the thermoplastic polymer is amorphous. In some embodiments, an amorphous thermoplastic polymer has a crystallinity of less than 20% or less than 15%, or less than 10% crystallinity, or less than 1% crystallinity, or 0% crystallinity. In some embodiments, the thermoplastic polymer can be an amorphous polymer that does not exhibit a melting point.

Examples of thermoplastic polymers that can be used include polyacetals (e.g., polyoxyethylene and polyoxymethylene), poly($C_{1-6}$ alkyl)acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylsulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polyethylene terephthalates, polybutylene terephthalates, polyarylates, and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl)methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination comprising at least one of the foregoing thermoplastic polymers. Polyacetals, polyamides (nylons), polycarbonates, polyesters, polyetherimide, polyolefins, and polystyrene copolymers such as ABS, are especially useful in a wide variety of articles, have good processability, and are recyclable.

Useful polyamides include, but are not limited to, synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are poly($C_{1-6}$ alkyl)acrylates and poly($C_{1-6}$ alkyl)methacrylates, which include, for example, polymers of methyl acrylate, ethyl acrylate, acrylamide, methacrylic acid, methyl methacrylate, n-butyl acrylate, and ethyl acrylate, to name a few.

Representative examples of polyolefins are polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene. Representative combinations of polyolefins are combinations containing polyethylene and polypropylene, low-density polyethylene and high-density polyethylene, and polyethylene and olefin copolymers containing copolymerizable monomers, some of which are described above, e.g., ethylene and acrylic acid copolymers; ethyl and methyl acrylate copolymers; ethylene and ethyl acrylate copolymers; ethylene and vinyl acetate copolymers, ethylene, acrylic acid, and ethyl acrylate copolymers, and ethylene, acrylic acid, and vinyl acetate copolymers.

In some embodiments, the thermoplastic polymer comprises a polycarbonate, a polyetherimide, a polyimide, a polysulfone, a polyethersulfone, a polyphenylene sulfone, a polyarylene ether, a polyetherether ketone, a polyamide or a combination comprising at least one of the foregoing. In some embodiments, the thermoplastic polymer comprises polyetherimide, polycarbonate, or a combination comprising at least one of the foregoing.

In some embodiments, the thermoplastic polymer comprises a polyetherimide. Polyetherimides comprise more than 1, for example 10 to 1000, or 10 to 500, structural units of formula (1)

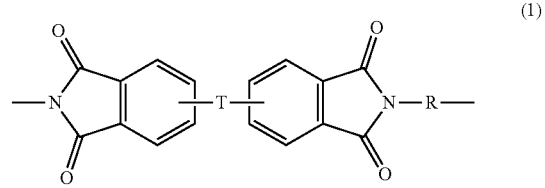

wherein each R is independently the same or different, and is a substituted or unsubstituted divalent organic group, such as a substituted or unsubstituted $C_{6-20}$ aromatic hydrocarbon group, a substituted or unsubstituted straight or branched chain $C_{2-20}$ alkylene group, a substituted or unsubstituted $C_{3-8}$ cycloalkylene group, or a halogenated derivative of any of the foregoing. In some embodiments, R is a divalent group of one or more of the following formulae (2)

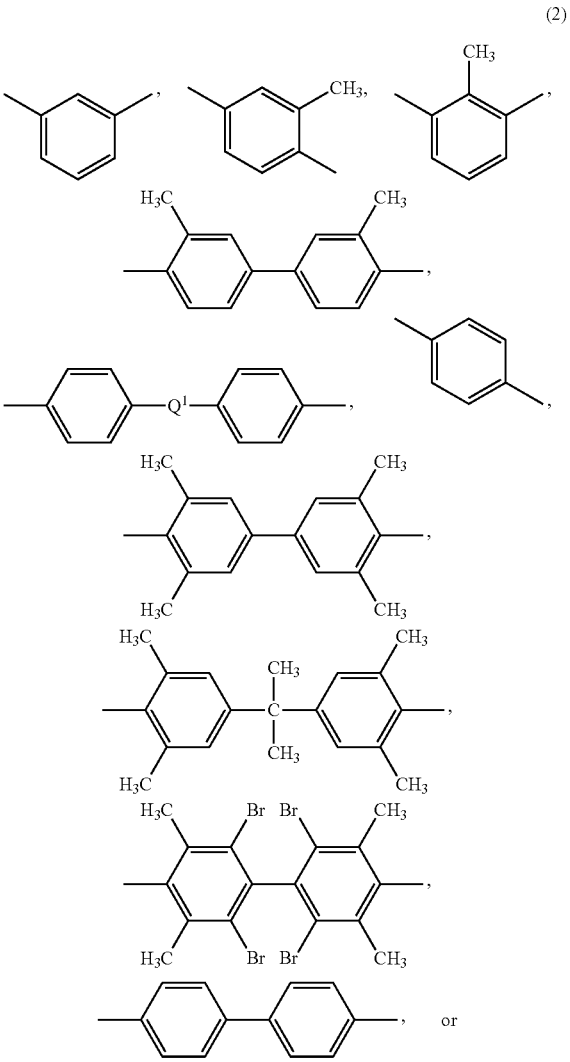

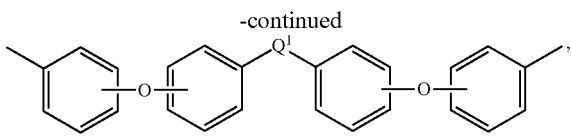

wherein $Q^1$ is —O—, —S—, —C(O)—, —SO$_2$—, —SO—, —P(R$^a$)(=O)— wherein R$^a$ is a C$_{1-8}$ alkyl or C$_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In some embodiments R is m-phenylene, p-phenylene, or a diarylene sulfone, in particular bis(4,4'-phenylene)sulfone, bis(3,4'-phenylene)sulfone, bis(3,3'-phenylene)sulfone, or a combination comprising at least one of the foregoing. In some embodiments, at least 10 mole percent or at least 50 mole percent of the R groups contain sulfone groups, and in other embodiments no R groups contain sulfone groups.

Further in formula (1), T is —O— or a group of the formula —O—Z—O— wherein the divalent bonds of the —O—Z—O— group are in the 3,3',3,4',4,3', or the 4,4' positions, and Z is an aromatic C$_{6-24}$ monocyclic or polycyclic moiety optionally substituted with 1 to 6 C$_{1-8}$ alkyl groups, 1 to 8 halogen atoms, or a combination comprising at least one of the foregoing, provided that the valence of Z is not exceeded. Exemplary groups Z include groups of formula (3)

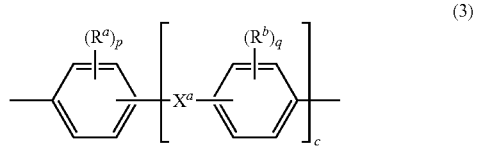

(3)

wherein R$^a$ and R$^b$ are each independently the same or different, and are a halogen atom or a monovalent C$_{1-6}$ alkyl group, for example; p and q are each independently integers of 0 to 4; c is 0 to 4; and X$^a$ is a bridging group connecting the hydroxy-substituted aromatic groups, where the bridging group and the hydroxy substituent of each C$_6$ arylene group are disposed ortho, meta, or para (specifically para) to each other on the C$_6$ arylene group. The bridging group X$^a$ can be a single bond, —O—, —S—, —S(O)—, —S(O)$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of formula (3a)

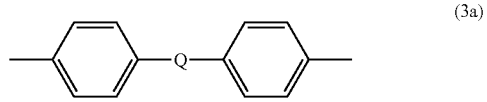

(3a)

wherein Q is —O—, —S—, —C(O)—, —SO$_2$—, —SO—, —P(R$^a$)(=O)— wherein R$^a$ is a C$_{1-8}$ alkyl or C$_{6-12}$ aryl, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

In an embodiment in formula (1), R is m-phenylene, p-phenylene, or a combination comprising at least one of the foregoing, and T is —O—Z—O— wherein Z is a divalent group of formula (3a). Alternatively, R is m-phenylene, p-phenylene, or a combination comprising at least one of the foregoing, and T is —O—Z—O— wherein Z is a divalent group of formula (3a) and Q is 2,2-isopropylidene. Alternatively, the polyetherimide can be a copolymer optionally comprising additional structural polyetherimide units of formula (1) wherein at least 50 mole percent (mol %) of the R groups are bis(4,4'-phenylene)sulfone, bis(3,4'-phenylene)sulfone, bis(3,3'-phenylene)sulfone, or a combination comprising at least one of the foregoing and the remaining R groups are p-phenylene, m-phenylene, or a combination comprising at least one of the foregoing; and Z is 2,2-(4-phenylene)isopropylidene, i.e., a bisphenol A moiety.

In some embodiments, the polyetherimide is a copolymer that optionally comprises additional structural imide units that are not polyetherimide units, for example imide units of the formula

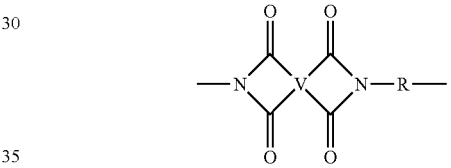

wherein R is as described in formula (1) and each V is the same or different, and is a substituted or unsubstituted C$_{6-20}$ aromatic hydrocarbon group, for example a tetravalent linker of the formulas

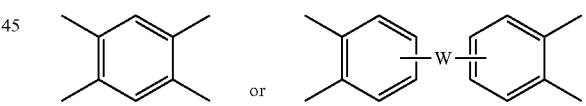

wherein W is a single bond, —O—, —S—, —C(O)—, —SO$_2$—, —SO—, —P(R$^a$)(=O)— wherein R$^a$ is a C$_{1-8}$ alkyl or C$_{6-12}$ aryl, or —C$_y$H$_{2y}$— wherein y is an integer from 1 to 5 or a halogenated derivative thereof (which includes perfluoroalkylene groups). These additional structural imide units preferably comprise less than 20 mol % of the total number of units, and more preferably can be present in amounts of 0 to 10 mol % of the total number of units, or 0 to 5 mol % of the total number of units, or 0 to 2 mole % of the total number of units. In some embodiments, no additional imide units are present in the polyetherimide.

The polyetherimide can be prepared by any of the methods well known to those skilled in the art, including the reaction of an aromatic bis(ether anhydride) of formula (5) or a chemical equivalent thereof, with an organic diamine of formula (6)

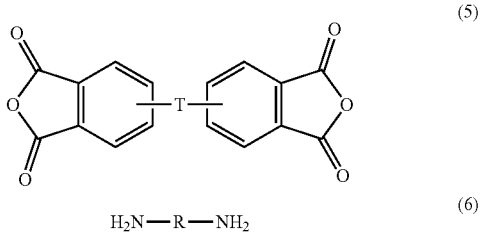

$$H_2N-R-NH_2 \quad (6)$$

wherein T and R are defined as described above. Copolymers of the polyetherimides can be manufactured using a combination of an aromatic bis(ether anhydride) of formula (5) and an additional bis(anhydride) that is not a bis(ether anhydride), for example pyromellitic dianhydride or bis(3,4-dicarboxyphenyl) sulfone dianhydride.

Illustrative examples of aromatic bis(ether anhydride)s include 2,2-bis[4-(3,4-dicarboxyphenoxy)phenyl]propane dianhydride (also known as bisphenol A dianhydride or BPADA), 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; 4,4'-(hexafluoroisopropylidene) diphthalic anhydride; and 4-(2,3-dicarboxyphenoxy)-4'-(3,4-dicarboxyphenoxy)diphenyl sulfone dianhydride. A combination of different aromatic bis(ether anhydride)s can be used.

Examples of organic diamines include 1,4-butane diamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. $C_{1-4}$ alkylated or poly($C_{1-4}$)alkylated derivatives of any of the foregoing can be used, for example a polymethylated 1,6-hexanediamine. Combinations of these compounds can also be used. In some embodiments the organic diamine is m-phenylenediamine, p-phenylenediamine, 4,4'-diaminodiphenyl sulfone, 3,4'-diaminodiphenyl sulfone, 3,3'-diaminodiphenyl sulfone, or a combination comprising at least one of the foregoing.

The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide has a weight average molecular weight (Mw) of 1,000 to 150,000 grams/mole (Dalton), as measured by gel permeation chromatography, using polystyrene standards. In some embodiments the polyetherimide has an Mw of 10,000 to 80,000 Daltons. Such polyetherimides typically have an intrinsic viscosity greater than 0.2 deciliters per gram (dl/g), or, more specifically, 0.35 to 0.7 dl/g as measured in m-cresol at 25° C.

In some embodiments, the thermoplastic polymer comprises a polycarbonate. "Polycarbonate" as used herein means a polymer or copolymer having repeating structural carbonate units of formula (7)

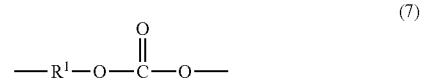

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (8) or a bisphenol of formula (9).

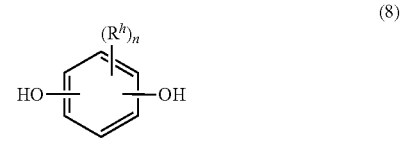

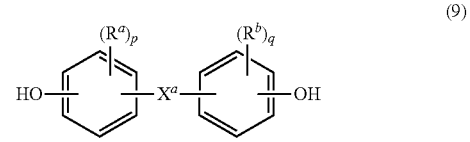

In formula (8), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (9), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, X' can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of dihydroxy compounds that can be used are described, for example, in WO 2013/175448 A1, US 2014/0295363, and WO 2014/072923. Specific dihydroxy compounds include resorcinol, 2,2-bis(4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxy-3-methylphenyl)-3,3,5-trimethylcyclohexane (isophorone bisphenol).

"Polycarbonate" as used herein also includes copolymers comprising carbonate units and ester units ("poly(ester-carbonate)s", also known as polyester-polycarbonates). Poly (ester-carbonate)s further contain, in addition to recurring carbonate chain units of formula (1), repeating ester units of formula (10)

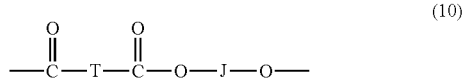

(10)

wherein J is a divalent group derived from a dihydroxy compound (which includes a reactive derivative thereof), and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, specifically, 2, 3, or 4 carbon atoms; and T is a divalent group derived from a dicarboxylic acid (which includes a reactive derivative thereof), and can be, for example, a $C_{2-20}$ alkylene, a $C_{6-20}$ cycloalkylene, or a $C_{6-20}$ arylene. Copolyesters containing a combination of different T or J groups can be used. The polyester units can be branched or linear.

Specific dihydroxy compounds include aromatic dihydroxy compounds of formula (8) (e.g., resorcinol), bisphenols of formula (9) (e.g., bisphenol A), a $C_{1-8}$ aliphatic diol such as ethane diol, n-propane diol, i-propane diol, 1,4-butane diol, 1,6-cyclohexane diol, 1,6-hydroxymethylcyclohexane, or a combination comprising at least one of the foregoing dihydroxy compounds. Aliphatic dicarboxylic acids that can be used include $C_{6-20}$ aliphatic dicarboxylic acids (which includes the terminal carboxyl groups), specifically linear $C_{8-12}$ aliphatic dicarboxylic acid such as decanedioic acid (sebacic acid); and alpha, omega-$C_{12}$ dicarboxylic acids such as dodecanedioic acid (DDDA). Aromatic dicarboxylic acids that can be used include terephthalic acid, isophthalic acid, naphthalene dicarboxylic acid, 1,6-cyclohexane dicarboxylic acid, or a combination comprising at least one of the foregoing acids. A combination of isophthalic acid and terephthalic acid wherein the weight ratio of isophthalic acid to terephthalic acid is 91:9 to 2:98 can be used.

Specific ester units include ethylene terephthalate units, n-propylene terephthalate units, n-butylene terephthalate units, ester units derived from isophthalic acid, terephthalic acid, and resorcinol (ITR ester units), and ester units derived from sebacic acid and bisphenol A. The molar ratio of ester units to carbonate units in the poly(ester-carbonate)s can vary broadly, for example 1:99 to 99:1, specifically, 10:90 to 90:10, more specifically, 25:75 to 75:25, or from 2:98 to 15:85.

The polycarbonates can have an intrinsic viscosity, as determined in chloroform at ° C., of 0.3 to 1.5 deciliters per gram (dl/gm), specifically 0.45 to 1.0 dl/gm. The polycarbonates can have a weight average molecular weight of 5,000 to 200,000 Daltons, specifically 15,000 to 100,000 Daltons, as measured by gel permeation chromatography (GPC), using a crosslinked styrene-divinylbenzene column and calibrated to polycarbonate references. GPC samples are prepared at a concentration of 1 mg per ml (mg/ml), and are eluted at a flow rate of 1.5 ml per minute.

In some embodiments, the powder composition can further comprise one or more optional components. An optional component is present in a sufficient amount to perform its intended function without adversely affecting the powder composition or an article prepared therefrom. For example, the one or more optional components can comprise a particulate inorganic filler (such as glass, ceramic, or metal, e.g., ceramic particles), a particulate organic filler (such as carbon or a crosslinked polymer), conductive filler (such as graphite or single-walled or multi-walled carbon nanotubes), an inorganic filler, organic fiber, inorganic fiber, conductive ink, antioxidant, heat stabilizer, light stabilizer, ultraviolet (UV) light stabilizer, UV absorbing additive, NIR absorbing additive, IR absorbing additive, laser marking dye, plasticizer, lubricant, release agent (such as a mold release agent), antistatic agent, anti-fog agent, antimicrobial agent, colorant (e.g, a dye or pigment), surface effect additive, radiation stabilizer, flame retardant, anti-drip agent (e.g., a PTFE-encapsulated styrene-acrylonitrile copolymer (TSAN)), a fragrance, or a combination comprising at least one of the foregoing. When present, each individual optional component can be included in the powder composition in an amount of 0.01 to 30 wt %, based on the total weight of the powder composition. The total amount of all optional components in the powder composition ranges from 0 up to 30 wt %, based on the total weight of the powder composition. For example, the total amount of the additive composition (other than any filler) can be 0.001 to 10.0 wt %, or 0.01 to 5 wt %, each based on the total weight of the first solution.

The powder composition can optionally contain a flow promoter. The flow promoter preferably is present in an amount sufficient to provide the particles with a flowability of greater than or equal to 4, more preferably greater than or equal to 10. In some embodiments, the powder composition can include a flow promoter in an amount of 0.005 to 1 wt %, based on the total weight of the powder composition.

The optional flow promoter, when included in the powder composition, can include an unmodified fumed metal oxide, a hydrophobic fumed metal oxide, a hydrophilic fumed metal oxide, or a combination comprising at least one of the foregoing. In some embodiments, the flow promoter can be fumed silica, fumed aluminum oxide, a hydrated silica, amorphous alumina, a glassy silica, a glassy phosphate, a glassy borate, a glassy oxide, titania, talc, mica, a fumed silica, kaolin, attapulgite, calcium silicate, alumina, magnesium silicate, or a combination comprising at least one of the foregoing, more preferably fumed silica.

Another optional component is a coloring agent, for example a pigment or a dye, like carbon black, to impart a desired color to the article of manufacture. The coloring agent is not limited, as long as the coloring agent does not adversely affect the composition or an article prepared therefrom, and is sufficiently stable to retain its color under conditions of the laser sintering process and during exposure to the laser.

The powder compositions described herein can be particularly useful for a variety of applications, including forming three dimensional articles or powder coatings. Accordingly, another aspect of the present disclosure includes a method of preparing a powder coating comprises applying a powder coating layer comprising the above-described powder composition to a substrate, and consolidating the powder coating layer to form the powder coating. Applying the powder coating layer can be by any method that is generally known, for example by scattering, sprinkling, spraying, thermal or flame spraying, electrostatic spraying, or by fluidized bed coating methods. In some embodiments, the particles or the substrate can be given an electrostatic charge so that they will adhere well. Examples of substrates that can be coated include, but are not limited to, glass, plastic, wood, metal, ceramics, or a combination comprising at least one of the foregoing substrates. These substrates can be used as part of any number of different articles. Consolidating the powder coating layer to form the powder coating can include applying heat or pressure or both to coalesce or fuse the particles to form the powder coating. Heating can be achieved at a temperature above the melting range of the powder composition, for example in a temperature range of 80 to 220° C. The temperature is dependent on the type of thermoplastic particles. The heating can be by gas or air heating, or IR or NIR, as known in the art. A powder-coated article made by the above method represents another aspect of the present disclosure.

In another embodiment, the present disclosure includes a method of preparing a three-dimensional article comprising compression molding the powder composition to form the three-dimensional object.

In yet another embodiment, the powder compositions of the present disclosure can be fusible powder compositions, and therefore can be particularly useful in a powder bed fusing process. The term "powder bed fusing" or "powder bed fusion" as used herein refers to processes wherein the powder is selectively sintered or melted and fused, layer-by-layer to provide a three-dimensional article. Sintering can result in articles having a density of less than about 90% of the density of the solid powder composition, whereas melting can provide objects having a density of 90%-100% of the solid powder composition. Powder bed fusing or powder bed fusion further includes all laser sintering and all selective laser sintering processes as well as other powder bed fusing technologies as defined by ASTM F2792-12a. For example, sintering of the powder composition can be accomplished via application of electromagnetic radiation other than that produced by a laser, with the selectivity of the sintering achieved, for example, through selective application of inhibitors, absorbers, susceptors, or the electromagnetic radiation (e.g., through use of masks or directed laser beams). Any other suitable source of electromagnetic radiation can be used, including, for example, infrared radiation sources, microwave generators, lasers, radiative heaters, lamps, or a combination thereof. In some embodiments, selective mask sintering ("SMS") techniques can be used to produce three-dimensional articles of the invention. For further discussion of SMS processes, see for example U.S. Pat. No. 6,531,086 which describes an SMS machine in which a shielding mask is used to selectively block infrared radiation, resulting in the selective irradiation of a portion of a powder layer. If using an SMS process to produce articles from powder compositions of the invention, it can be desirable to include one or more materials in the powder composition that enhance the infrared absorption properties of the powder composition. For example, the powder composition can include one or more heat absorbers or dark-colored materials (e.g., carbon black, carbon nanotubes, or carbon fibers).

Powder bed fused (e.g., laser sintered) articles can include a plurality of overlying and adherent sintered layers that include a polymeric matrix which, in some embodiments, have reinforcement particles dispersed throughout the polymeric matrix. "Plurality" as used in the context of additive manufacturing includes 5 or more layers, or 20 or more layers. The maximum number of layers can vary greatly, determined, for example, by considerations such as the size of the article being manufactured, the technique used, the capabilities of the equipment used, and the level of detail desired in the final article. For example, 5 to 100,000 layers can be formed, or 20 to 50,000 layers can be formed, or 50 to 50,000 layers can be formed. As used herein, "layer" is a term of convenience that includes any shape, regular or irregular, having at least a predetermined thickness. In some embodiments, the size and configuration two dimensions are predetermined, and in some embodiments, the size and shape of all three-dimensions of the layer is predetermined. The thickness of each layer can vary widely depending on the additive manufacturing method. In some embodiments the thickness of each layer as formed differs from a previous or subsequent layer. In some embodiments, the thickness of each layer is the same. In some embodiments the thickness of each layer as formed is 0.5 millimeters (mm) to 5 mm. In some embodiments, the fused layers of powder bed fused articles can be of any thickness suitable for selective laser sintered processing. For example, the individual layers can be each, on average, preferably at least 50 micrometers (μm) thick, more preferably at least 80 μm thick, and even more preferably at least 100 μm thick. In a preferred embodiment, the plurality of sintered layers are each, on average, preferably less than 500 μm thick, more preferably less than 300 μm thick, and even more preferably less than 200 μm thick. Thus, the individual layers for some embodiments can be 50 to 500 μm, 80 to 300 μm, or 100 to 200 μm thick. Three-dimensional articles produced from powder compositions of the invention using a layer-by-layer powder bed fusing processes other than selective laser sintering can have layer thicknesses that are the same or different from those described above.

Laser sintering processes are sufficiently well known, and are based on the selective sintering of polymer particles, where layers of polymer particles are briefly exposed to laser light and the polymer particles exposed to the laser light are thus bonded to one another. Successive sintering of layers of polymer particles produces three-dimensional objects. Details concerning the selective laser sintering process are found, by way of example, in U.S. Pat. No. 6,136,948 and WO 96/06881.

An example of a SLS system for fabricating a three-dimensional article from the powder composition can be described as follows. One thin layer of powder composition comprising the powder composition is spread over the sintering chamber. The laser beam traces the computer-controlled pattern, corresponding to the cross-section slice of the CAD model, to melt the powder selectively which has been preheated to slightly, preferably below its melting temperature. After one layer of powder is sintered, the powder bed piston is lowered with a predetermined increment (typically 100 μm), and another layer of powder is spread over the previous sintered layer by a roller. The process then repeats as the laser melts and fuses each successive layer to the previous layer until the entire article is completed.

In some embodiments, a typical sintering process, such as described above, can use a powder comprising thermoplastic particles that exhibit a melting transition (e.g., a melting temperature, Tm), which aids in obtaining a distinct region that is intended to be fused. The heat generated can diffuse away from the region of interest, however the temperature can decrease to below the melting temperature of the particles rapidly. Accordingly, outside the region of interest the powder composition advantageously remains in the unfused form. In contrast, in embodiments utilizing particles that do not exhibit a melting point (e.g., amorphous polymers), particle fusion is possible everywhere the temperature is above the glass transition temperature (Tg). In order to obtain a similar level of resolution in a three-dimensional article prepared by powder bed fusing amorphous polymer particles, the present inventors have determined that the timing of the coalescence during a powder bed fusion process is dependent on particle size. The time scale of the coalescence process can be estimated as the time for the volume V of polymer in the particle to flow through an opening the size of the particle. The velocity, U, is proportional to the driving pressure divided by the viscosity μ, as shown in the following relationship.

$$U \sim \frac{P}{\mu}$$

The time scale, τ, is given by the relationship $$\tau \sim \frac{V}{U \cdot A} = \frac{\mu R^2}{2\gamma},$$

wherein γ is the surface tension of the molten particle, R is the particle radius, and $A=\pi R^2$.

The quadratic dependence of the coalescence time scale on particle size is evident from the relationship above. Shorter time scales can lead to shorter heating cycles, and thus better resolution in the final article. Thus, by careful selection of the particle size of the powder compositions, the present disclosure can advantageously provide powder compositions comprising amorphous thermoplastic polymers for additive manufacturing processes (e.g., selective laser sintering). Accordingly, in some embodiments, preferably in embodiments where thermoplastic particles comprising an amorphous polymer are used, the powder composition preferably comprises thermoplastic particles having a first D50 of 100 nm to 50 μm, preferably 150 nm to 25 μm, more preferably 200 nm to 10 μm.

Another aspect of the present disclosure includes three-dimensional articles made by powder bed fusing the powder compositions. After a layer-by-layer manufacture of an article of manufacture, the article can exhibit excellent resolution, durability, and strength. These articles of manufacture can have a wide variety of uses, including as prototypes and as end products as well as molds for end products.

The compositions, methods, and articles described herein are further illustrated by the following non-limiting example.

EXAMPLES

Figure 3:
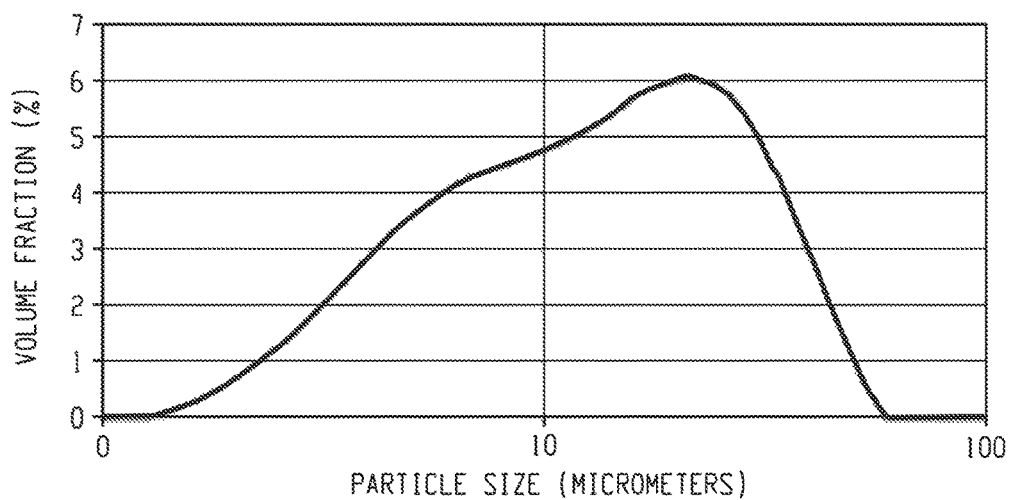
FIG. 3 shows a particle size distribution of a polyetherimide powder sample.

FIG. 3 shows a particle size distribution of a powder used for the following examples. The powder comprises a polyetherimide obtained as ULTEM 1000 from SABIC. The particle size distribution was obtained using a diffractometer. As can be seen from FIG. 3, the distribution of sizes is broad, ranging from 1 to 100 micrometers.

Figure 4:
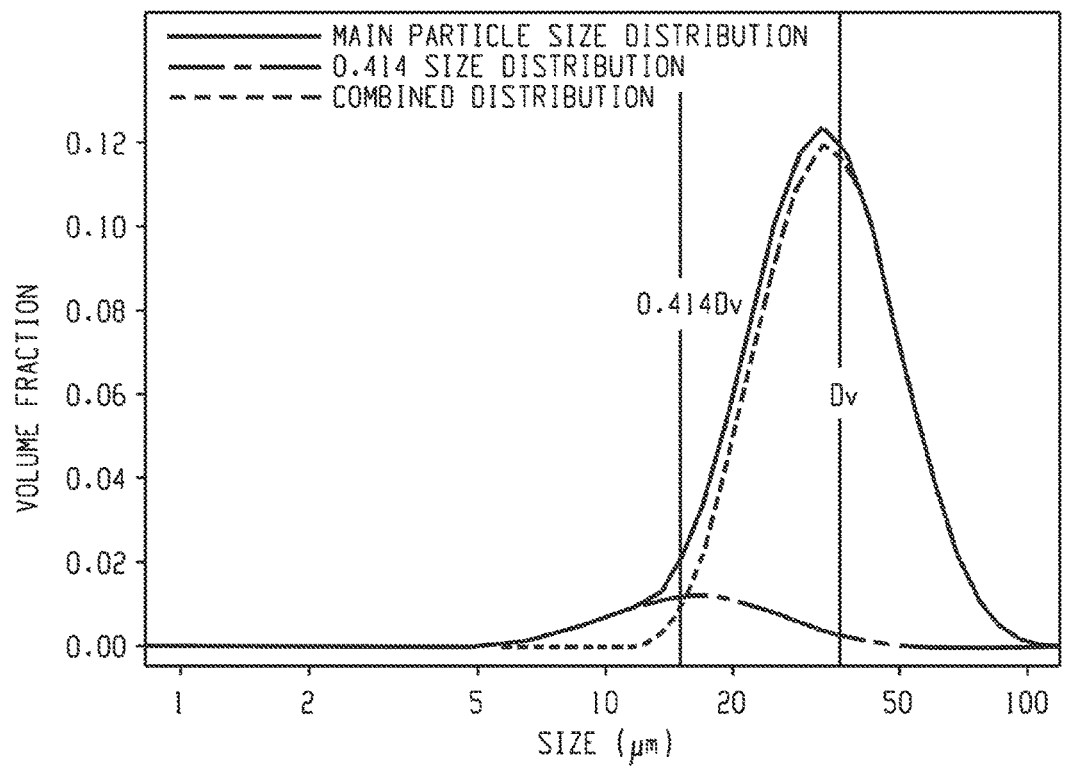
FIG. 4 shows an overlay of the particle size distributions of the main particle size distribution, the 0.414 size distribution, and the combined distribution.

To demonstrate the improved sintering performance of a powder having an optimized particle size distribution, the powder sample was fractionated according to size by sedimentation. The fractions were recombined at 89% of the particle size distribution having a volume averaged size of Dv, and 11% of the particle size distribution having a peak size equal to 0.414 times Dv. The particle size distributions of the two components, and the particle size distribution resulting from their combination, are shown in FIG. 4.

Figure 5:
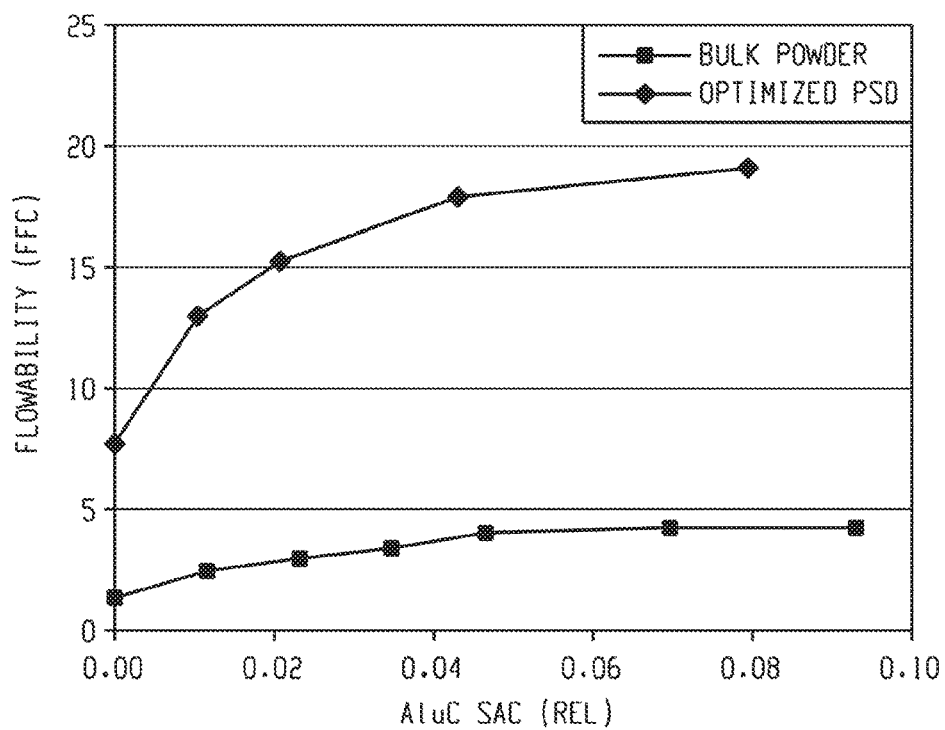
FIG. 5 shows the flowability as a function of flow promoter content (in terms of relative surface area coverage (SAC)) for a bulk powder and an optimized powder.

A marked improvement in the flowability of the combined particle size distribution was noted. The bulk powder exhibited a flowability ($ff_c$) of 1 to 5. The "optimized" powder having the combined particle size distribution was both displaced vertically and had a greater range of improvement with the presence of flow promoting nanoparticles. For example, FIG. 5 shows the flowability as a function of flow promoter content (in terms of relative surface area coverage (SAC)) for the bulk powder and the optimized powder. The flow promoter was an aluminum oxide flow promoter (obtained as AEROXIDE AluC from Evonik Industries). Notably, the optimized powder was observed to reasonably flow even without the presence of a flow modifier, whereas the bulk powder exhibited substantially cohesive behavior.

The bulk and optimized powder samples were then tested for their utility in SLS. Impact bars (40×10×2 millimeters) were printed on a SLS printer. During the SLS printing, the optimized powder was observed to exhibit good flowability, even at high temperature, and filling of the fresh powder on sintered areas was homogenous. In contrast, the flowability of the bulk powder was uneven and was observed to worsen at elevated temperatures, resulting in voids in the printed parts. Furthermore, the melt behavior of the optimized powder was observed to be improved relative to the bulk powder (i.e., burned areas were not observed even at high laser power with the optimized powder, whereas the bulk powder exhibited burning at similar laser powers).

Additionally, in typical printing processes, for example using bulk materials, a significant amount of powder sticks to the printed parts, even after cleaning by sand blasting. In contrast, almost no excess powder remained on the printed parts printed from the optimized powder sample after treatment by sandblasting.

The density of the printed impact bars was measured. The impact bars prepared from the bulk powder exhibited densities of 0.9506 to 0.9729 grams per milliliter. The impact bars prepared from the optimized powder exhibited densities of 1.2378 to 1.2432 grams per milliliter. The commercial polyetherimide itself from which the powders were prepared has a density of 1.27 grams per milliliter. So the bars printed from the optimized powders had a density of about 97.7% that of the commercial polyetherimide sample, whereas bars from the bulk powder exhibited a density of 75.8% that of the commercial polyetherimide sample.

The compositions, methods, and articles disclosed herein are further illustrated by the following embodiments, which are non-limiting.

Embodiment 1

A powder composition, comprising a plurality of thermoplastic particles characterized by a bimodal particle size distribution comprising, based on the total weight of the particles, 85 to 94 wt %, preferably 87 to 91 wt %, more preferably 89 wt % of the particles having a first D50 less than 1 millimeter; and 6 to 15, preferably 9 to 13, more preferably 11 wt % of the particles having a D50 that is 0.414 times the first D50.

Embodiment 2

A powder composition, comprising a plurality of thermoplastic particles characterized by a bimodal particle size distribution comprising, based on the total weight of the particles, 67 to 77 wt %, preferably 70 to 74 wt %, more preferably 72 wt % of the particles having a first D50 less than 1 millimeter; and 23 to 33, preferably 26 to 30, more preferably 28 wt % of the particles having a second D50 that is 0.732 times the first D50.

Embodiment 3

A powder composition, comprising a plurality of thermoplastic particles characterized by a trimodal particle size distribution comprising, based on the total weight of the particles, 66 to 76 wt %, preferably 69 to 73 wt %, more preferably 71 wt % of the particles having a first D50 less than 1 millimeter; 23 to 33 wt %, preferably 26 to 30 wt %, more preferably 28 wt % of the particles having a second D50 that is 0.732 times the first D50; and 0.5 to 5 wt %, preferably 1 to 3 wt %, more preferably 1 wt % of the particles having a third D50 that is 0.268 times the first D50.

Embodiment 4

The powder composition of any one or more of embodiments 1 to 3, wherein the first D50 is from 1 nm to 500 micrometer, preferably from 15 nm to 100 μm, more preferably from 25 nm to 50 μm.

Embodiment 5

The powder composition of any one or more of embodiments 1 to 3, wherein the first D50 is from 100 nm to 50 μm, preferably from 150 nm to 25 μm, more preferably from 200 nm to 10 μm.

Embodiment 6

The powder composition of embodiment 5, wherein the thermoplastic polymer is amorphous.

Embodiment 7

The powder composition of any one or more of embodiments 1 to 6, wherein the thermoplastic polymer is a polyacetal, poly($C_{1-6}$ alkyl)acrylate, polyacrylamide, polyamide, polyamideimide, polyanhydride, polyarylate, polyarylene ether, polyarylene sulfide, polyarylsulfone, polybenzothiazole, polybenzoxazole, polycarbonate, polyester, polyetheretherketone, polyetherimide, polyetherketoneketone, polyetherketone, polyethersulfone, polyimide, poly($C_{1-6}$ alkyl)methacrylate, polymethacrylamide, polynorbornenes, polyolefin, polyoxadiazole, polyoxymethylene, polyphthalide, polysilazane, polysiloxane, polystyrene, polysulfide, polysulfonamide, polysulfonate, polysulfone, polythioester, polytriazine, polyurea, polyurethane, polyvinyl alcohol, polyvinyl ester, polyvinyl ether, polyvinyl halide, polyvinyl ketone, polyvinyl thioether, polyvinylidene fluoride, or a combination comprising at least one of the foregoing thermoplastic polymers.

Embodiment 8

The powder composition of any one or more of embodiments 1 to 7, wherein the thermoplastic polymer is a polycarbonate, a polyetherimide, a polyimide, a polysulfone, a polyethersulfone, a polyphenylene sulfone, a polyarylene ether, a polyetherether ketone, a polyamide or a combination comprising at least one of the foregoing, preferably a polycarbonate, a polyetherimide, or a combination comprising at least one of the foregoing.

Embodiment 9

The powder composition of any one or more of embodiments 1 to 8, wherein the thermoplastic polymer is amorphous.

Embodiment 10

The powder composition of any one or more of embodiments 1 to 9, further comprising a particulate filler, antioxidant, heat stabilizer, light stabilizer, ultraviolet light stabilizer, ultraviolet light-absorbing compound, near infrared light-absorbing compound, infrared light-absorbing compound, plasticizer, lubricant, release agent, antistatic agent, anti-fog agent, antimicrobial agent, colorant, surface effect additive, radiation stabilizer, flame retardant, anti-drip agent, or a combination comprising at least one of the foregoing, preferably a colorant.

Embodiment 11

The powder composition of any one or more of embodiments 1 to 10, further comprising a flow promoter in an amount of 0.005 to 1 wt %, based on the weight of the thermoplastic polymer particles, to provide particles having a flowability of greater than or equal to 4, more preferably greater than or equal to 10.

Embodiment 12

The powder composition of embodiment 11, wherein the flow promoter comprises an unmodified fumed metal oxide, a hydrophobic fumed metal oxide, a hydrophilic fumed metal oxide, or a combination comprising at least one of the foregoing, preferably fumed silica, fumed aluminum oxide, a hydrated silica, amorphous alumina, a glassy silica, a glassy phosphate, a glassy borate, a glassy oxide, titania, talc, mica, a fumed silica, kaolin, attapulgite, calcium silicate, alumina, magnesium silicate, or a combination comprising at least one of the foregoing, more preferably fumed silica.

Embodiment 13

The powder composition of any one or more of embodiments 1 to 12, wherein the thermoplastic particles have a sphericity of 0.9 to 1, or wherein the thermoplastic particles each have a minimum and a maximum radius of within 10%, preferably within 5%.

Embodiment 14

A method of preparing a three-dimensional article, the method comprising powder bed fusing the powder composition of any one or more of embodiments 1 to 13 to form a three-dimensional article.

Embodiment 15

The method of embodiment 14, wherein the powder bed fusing comprises selective laser sintering.

Embodiment 16

A three-dimensional article made by the method of embodiment 15.

Embodiment 17

A method of preparing a powder coating, the method comprising: applying a powder coating layer comprising the powder composition of any one or more of embodiments 1 to 13 to a substrate; and consolidating the powder coating layer to form the powder coating.

Embodiment 18

A powder-coated article made by the method of embodiment 17.

Embodiment 19

A method of preparing a three-dimensional article, the method comprising compression molding the powder composition of any one or more of embodiments 1 to 13 to form the three-dimensional article.

Embodiment 20

A three-dimensional article made by the method of embodiment 19.

In general, the compositions, methods, and articles can alternatively comprise, consist of, or consist essentially of, any appropriate components or steps herein disclosed. The compositions, methods, and articles can additionally, or alternatively, be formulated so as to be devoid, or substantially free, of any components, materials, ingredients, adjuvants or species that are not necessary to the achievement of the function or objectives of the present claims.

All ranges disclosed herein are inclusive of the endpoints, and the endpoints are independently combinable with each other. "Or" means "and/or." "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. Reference throughout the specification to "another embodiment," "an embodiment," and so forth, means that a particular element described in connection with the embodiment is included in at least one embodiment described herein, and may or may not be present in other embodiments. In addition, it is to be understood that the described elements may be combined in any suitable manner in the various embodiments.

As used herein, the term "hydrocarbyl" includes groups containing carbon, hydrogen, and optionally one or more heteroatoms (e.g., 1, 2, 3, or 4 atoms such as halogen, 0, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—$CH_2$—) or propylene (—$(CH_2)_3$—)). "Alkenyl" and "alkenylene" mean a monovalent or divalent, respectively, straight or branched chain hydrocarbon group having at least one carbon-carbon double bond (e.g., ethenyl (—HC=$CH_2$) or propenylene (—HC($CH_3$)=$CH_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —$C_nH_{2n-x}$ and —$C_nH_{2n-2x}$— wherein x is the number of cyclization(s). "Aryl" means a monovalent, monocyclic or polycyclic aromatic group (e.g., phenyl or naphthyl). "Arylene" means a divalent, monocyclic or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro (—$NO_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g. benzyl), $C_{7-12}$ alkylarylene (e.g, toluyl), $C_{4-12}$ heterocycloalkyl, $C_{3-12}$ heteroaryl, $C_{1-6}$ alkyl sulfonyl (—S(=O)$_2$-alkyl), $C_{6-12}$ arylsulfonyl (—S(=O)$_2$-aryl), or tosyl ($CH_3C_6H_4SO_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A powder composition, comprising:
   a plurality of thermoplastic particles characterized by a bimodal particle size distribution comprising, based on the total weight of the particles,
   67 to 77 weight percent of the particles having a first D50 less than 1 millimeter; and
   23 to 33 weight percent of the particles having a second D50 that is 0.732 times the first D50.

2. A powder composition, comprising:
a plurality of thermoplastic particles characterized by a trimodal particle size distribution comprising, based on the total weight of the particles,
66 to 76 weight percent of the particles having a first D50 less than 1 millimeter;
23 to 33 weight percent of the particles having a second D50 that is 0.732 times the first D50; and
0.5 to 5 weight percent of the particles having a third D50 that is 0.268 times the first D50.

3. A powder composition, comprising:
a plurality of thermoplastic particles characterized by a bimodal particle size distribution comprising, based on the total weight of the particles,
85 to 94 weight percent of the particles having a first D50 less than 1 millimeter; and
6 to 15 weight percent of the particles having a D50 that is 0.414 times the first D50.

4. The powder composition of claim 3, wherein the first D50 is from 1 nm to 500 micrometer.

5. The powder composition of claim 3, wherein the first D50 is from 100 nm to 50 μm.

6. The powder composition of claim 5, wherein the thermoplastic polymer is amorphous.

7. The powder composition of claim 3, wherein the thermoplastic polymer is a polyacetal, poly($C_{1-6}$ alkyl)acrylate, polyacrylamide, polyamide, polyamideimide, polyanhydride, polyarylate, polyarylene ether, polyarylene sulfide, polyarylsulfone, polybenzothiazole, polybenzoxazole, polycarbonate, polyester, polyetheretherketone, polyetherimide, polyetherketoneketone, polyetherketone, polyethersulfone, polyimide, poly($C_{1-6}$ alkyl)methacrylate, polymethacrylamide, polynorbornenes, polyolefin, polyoxadiazole, polyoxymethylene, polyphthalide, polysilazane, polysiloxane, polystyrene, polysulfide, polysulfonamide, polysulfonate, polysulfone, polythioester, polytriazine, polyurea, polyurethane, polyvinyl alcohol, polyvinyl ester, polyvinyl ether, polyvinyl halide, polyvinyl ketone, polyvinyl thioether, polyvinylidene fluoride, or a combination comprising at least one of the foregoing thermoplastic polymers.

8. The powder composition of claim 3, wherein the thermoplastic polymer is a polycarbonate, a polyetherimide, a polyimide, a polysulfone, a polyethersulfone, a polyphenylene sulfone, a polyarylene ether, a polyetherether ketone, a polyamide or a combination comprising at least one of the foregoing.

9. The powder composition of claim 3, wherein the thermoplastic polymer is amorphous.

10. The powder composition of claim 3, further comprising a particulate filler, antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent, fragrance, fiber, or a combination comprising at least one of the foregoing.

11. The powder composition of claim 3, further comprising a flow promoter in an amount of 0.005 to 1 weight percent, based on the weight of the thermoplastic polymer particles, to provide particles having a flowability of greater than or equal to 4.

12. The powder composition of claim 11, wherein the flow promoter comprises an unmodified fumed metal oxide, a hydrophobic fumed metal oxide, a hydrophilic fumed metal oxide, or a combination comprising at least one of the foregoing.

13. The powder composition of claim 3, wherein the thermoplastic particles have a sphericity of 0.9 to 1, or wherein the thermoplastic particles each have a minimum and a maximum radius of within 10%.

14. A method of preparing a three-dimensional article, the method comprising:
powder bed fusing the powder composition of claim 3 to form a three-dimensional article.

15. The method of claim 14, wherein the powder bed fusing comprises selective laser sintering.

16. A three-dimensional article made by the method of claim 15.

17. A method of preparing a powder coating, the method comprising:
applying a powder coating layer comprising the powder composition of claim 3 to a substrate; and
consolidating the powder coating layer to form the powder coating.

18. A powder-coated article made by the method of claim 17.

19. A method of preparing a three-dimensional article, the method comprising:
compression molding the powder composition of claim 3 to form the three-dimensional article.

20. A three-dimensional article made by the method of claim 19.

* * * * *